(No Model.)
J. T. & S. D. PORTER.
SAP BUCKET OR PAIL COVER.
No. 359,228. Patented Mar. 8, 1887.
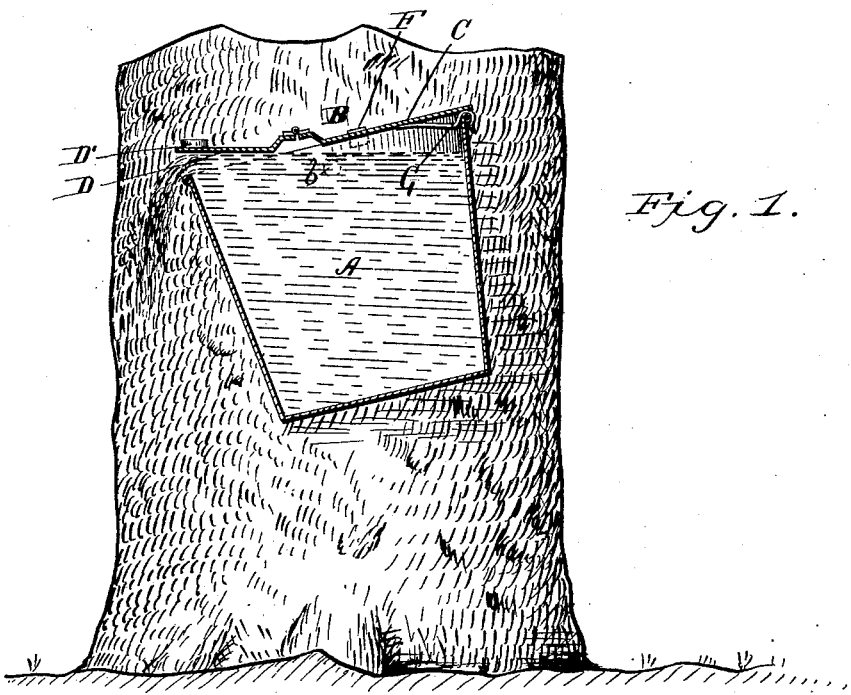
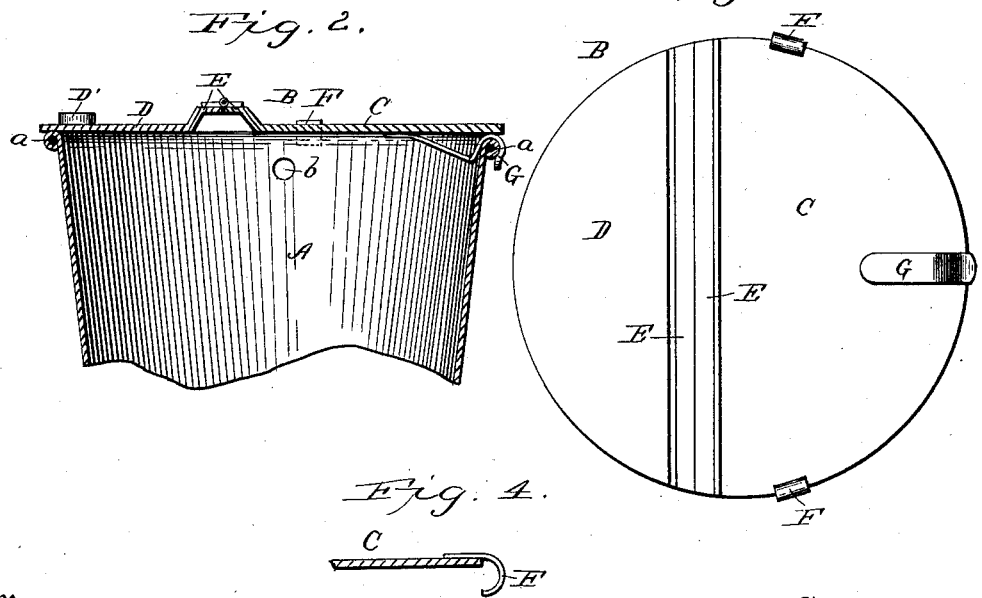
Witnesses
John S. Finch
C. D. Davis
Inventors:
J. T. & S. D. Porter
By their Attorney
C. M. Alexander

UNITED STATES PATENT OFFICE.

JOHN T. PORTER AND SIDNEY D. PORTER, OF SHEFFIELD, ASHTABULA COUNTY, OHIO.

SAP BUCKET OR PAIL COVER.

SPECIFICATION forming part of Letters Patent No. 359,228, dated March 8, 1887.

Application filed October 21, 1886. Serial No. 216,918. (No model.)

*To all whom it may concern:*

Be it known that we, JOHN T. PORTER and SIDNEY D. PORTER, citizens of the United States, residing at Sheffield, in the county of Ashtabula and State of Ohio, have invented certain new and useful Improvements in Sap Bucket or Pail Covers, of which the following is a specification, reference being had therein to the accompanying drawings.

Our invention relates to certain new and useful improvements upon covers or lids for buckets, and is especially designed for use in connection with sap buckets or pails, as will be more fully hereinafter described.

The invention has for its objects to provide a device of simple construction, that may be readily attached to a bucket and be securely held thereon, and when desired may be easily removed; that will allow the contents of the bucket to be emptied or run off without removing the cover, and that will effectually prevent the contents of the pail from being adulterated by mixture with any foreign impurities, as will be more fully hereinafter pointed out.

The invention consists, essentially, in combination with an ordinary pail or sap-bucket provided with a bead or flange around its upper edge or rim, of a circular lid approximately the size of the bucket and divided into two parts the adjacent edges of which are raised or struck up and hinged together, the larger or stationary portion of the cover being provided with fastening devices to attach it to the bucket, as will be more fully hereinafter described.

Referring to the annexed drawings, which illustrate our invention and form a part of this specification, Figure 1 represents a sectional view of a sap-bucket with our invention applied thereto; Fig. 2, a similar view with the lid in a different position; Fig. 3, a detail bottom view of the cover, and Fig. 4 a detail view of one of the securing-hooks.

Referring to the annexed drawings by letter, A designates a sap-bucket provided with the usual wired rim, $a$, and hole $b$ for hanging it upon the spout.

B designates the cover, which in this instance is circular in form, and is divided at a point a little to one side of its center, forming two plates or portions, C and D, the former being somewhat the larger. These plates along their contiguous edges are raised or struck up, as shown at E, and are hinged together, for the purpose hereinafter explained.

The larger or stationary portion of the cover at its rounded edge is provided with two curved hooks, F, so arranged as to catch under the wired rim and on each side of the bucket when in position. The plate C on its lower side, near its rounded edge and between the two hooks F, is also provided with a spring-catch, G, which springs over and clasps the bead on the rim of the bucket.

The catch G and hooks F are provided for the purpose of holding the cover securely upon the top of the bucket, as is evident from the drawings.

The hinged portion D of the cover is left free to open outwardly, and is provided with a weight, D', which automatically restores it to a closed position when the bucket is brought to a vertical position.

To attach the cover to a bucket, it is slid on from one side until the hooks F and catch G clasp the flange or bead upon the rim of the bucket, as clearly shown in the drawings. When it is desired to run off the liquid in the bucket, it is tilted and the force of the liquid will raise the weghted hinged plate D, which plate will fall back to its position when the bucket is again brought to a vertical position.

The object of raising or flanging the adjacent edges of the plates C and D is to form a water-shed to prevent rain, &c., from passing through the joint into the pail and thus injuring the contents thereof.

When the cover is applied to a sap-bucket, the same need not be removed from its hanging to be emptied of its sap, but simply tilted to one side, as shown in Fig. 1 of the drawings.

The advantage of this invention is that it effectually prevents all foreign substances—such as rain, snow, leaves, &c.—from entering the bucket, and will also prevent the cover being accidentally displaced or blown off by the wind.

We are aware that it is not new to construct a cover for buckets consisting of two plates hinged together, the larger one of which being provided with hooks and a thumb-screw for securing the cover to the bucket, and hence we do not claim such construction, broadly.

Having thus fully described our invention, what we claim, and desire to secure by Letters Patent, is—

The combination, with a bucket having a flanged rim, of the cover B, composed of the plates C and D, hinged together and provided with the upturned flanges E along their adjacent edges, the hooks F on the rounded edge of the plate C, and the spring-clasp G, secured upon the under side of the plate C, near its edge and about midway between the hooks F, the said clasp being adapted to clasp the flanged rim of the bucket, substantially as described.

In testimony whereof we affix our signatures in presence of two witnesses.

JOHN T. PORTER.
SIDNEY D. PORTER.

Witnesses:
A. C. WHITE,
E. JOY PINNEY.